United States Patent
Heitz et al.

(10) Patent No.: US 12,168,716 B2
(45) Date of Patent: Dec. 17, 2024

(54) METHOD FOR THE COMBINED PRODUCTION OF AT LEAST TWO TARGET PRODUCTS

(71) Applicant: BASF SE, Ludwigshafen (DE)

(72) Inventors: Thomas Heitz, Ludwigshafen (DE); Johann Diedrich Brand, Waterloo (BE); Joerg Erbes, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 717 days.

(21) Appl. No.: 17/434,051

(22) PCT Filed: Mar. 5, 2020

(86) PCT No.: PCT/EP2020/055907
§ 371 (c)(1),
(2) Date: Aug. 26, 2021

(87) PCT Pub. No.: WO2020/187593
PCT Pub. Date: Sep. 24, 2020

(65) Prior Publication Data
US 2022/0135737 A1    May 5, 2022

(30) Foreign Application Priority Data
Mar. 19, 2019  (EP) ..................... 19163893

(51) Int. Cl.
*C08G 63/672*  (2006.01)
*C08G 63/183*  (2006.01)
*C08G 63/78*   (2006.01)

(52) U.S. Cl.
CPC ......... *C08G 63/672* (2013.01); *C08G 63/183* (2013.01); *C08G 63/785* (2013.01)

(58) Field of Classification Search
USPC ...................................... 528/308.8; 422/134
See application file for complete search history.

(56) References Cited

U.S. PATENT DOCUMENTS

2009/0208381 A1   8/2009  Streng et al.

FOREIGN PATENT DOCUMENTS

EP        2995635 A1      3/2016
WO   WO-2017/157936 A1   9/2017

OTHER PUBLICATIONS

International Application No. PCT/EP2020/055907, International Search Report and Written Opinion, mailed May 20, 2020.

*Primary Examiner* — Fred M Teskin
(74) *Attorney, Agent, or Firm* — Grüneberg and Myers PLLC

(57) ABSTRACT

The present invention relates to a method for the combined production of at least two target products selected from the group consisting of (T1), (T2) and (T3), wherein (T1) is a terephthalate polyester, (T2) is a copolyester on the basis of terephthalic acid, at least one aliphatic 1,ω-dicarboxylic acid and at least one aliphatic 1,ω-diol, and (T3) is a copolyester on the basis of terephthalic acid, polytetramethylene glycol- and at least one aliphatic 1,ω-diol.

17 Claims, 1 Drawing Sheet

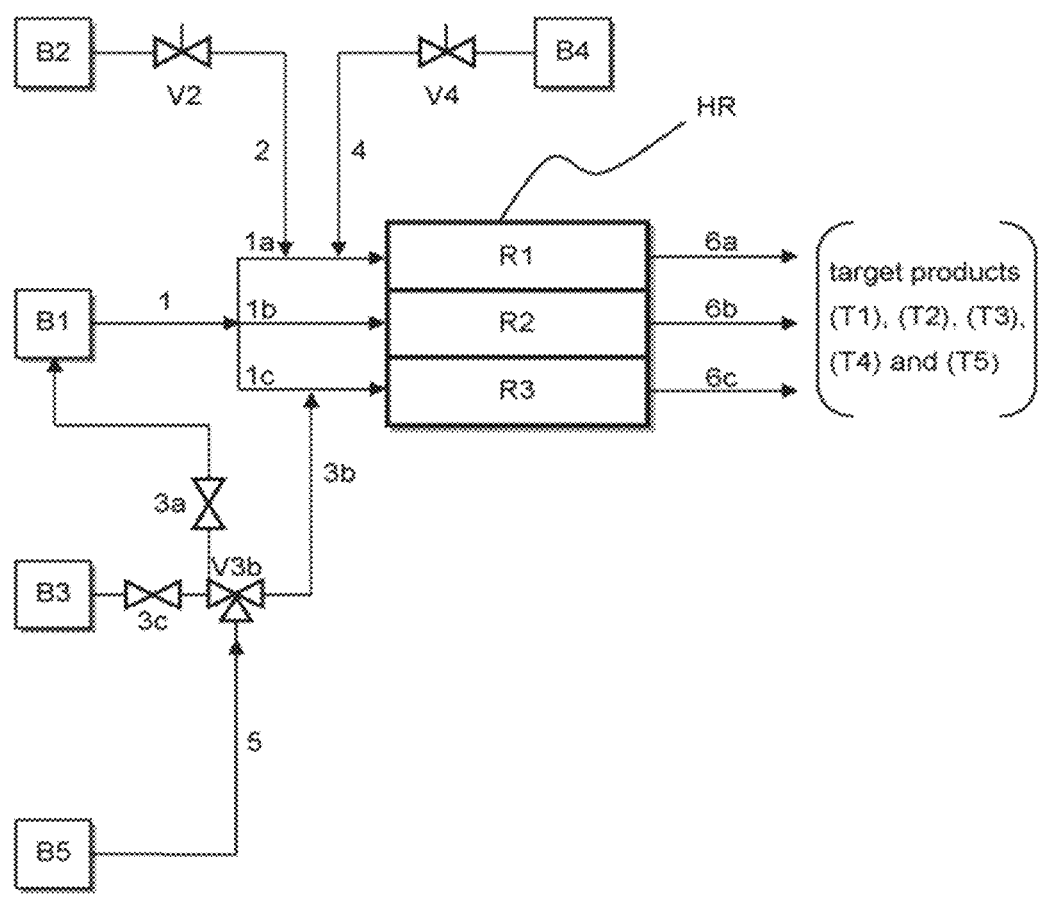

METHOD FOR THE COMBINED PRODUCTION OF AT LEAST TWO TARGET PRODUCTS

CROSS-REFERENCE TO RELATED APPLICATIONS

This is the U.S. national phase of International Application No. PCT/EP2020/055907, filed Mar. 5, 2020, which claims the benefit of European Patent Application No. 19163893.1, filed on Mar. 19, 2019.

BACKGROUND OF THE INVENTION

Field of the Invention

The present invention relates to a method for the combined production of at least two target products selected from the group consisting of (T1), (T2) and (T3), wherein (T1) is a terephthalate polyester, (T2) is a copolyester on the basis of terephthalic acid, at least one aliphatic 1,ω-dicarboxylic acid and at least one aliphatic 1,ω-diol, and (T3) is a copolyester on the basis of terephthalic acid, polytetramethylene glycol and at least one aliphatic 1,ω-diol.

Description of Related Art

Terephthalate (co)polyesters are well-known engineering plastics which have found application in many industries. They possess excellent mechanical, electrical and thermal properties, together with high chemical resistance and dimensional stability. Terephthalate (co)polyesters are generally prepared by polycondensation of terephthalic acid, at least one polyhydroxy compound comprising at least two hydroxyl groups and optionally at least one further component selected e.g. from aliphatic dicarboxylic acids, aromatic dicarboxylic acids and polyalkylene glycols.

Terephthalate copolyesters based on aliphatic and aromatic dicarboxylic acids can be used in biodegradable products or in fibres for clothing, terephthalate copolyesters based on polyalkylene glycols which are also known as thermoplastic polyester elastomers can be used in tubes or seals.

The polycondensation is usually carried out in a continuous reactor, wherein only one single terephthalate (co)polyester can be prepared. If it is desired to prepare many different terephthalate (co)polyesters, it is necessary to rebuild the continuous reactor after the preparation of each terephthalate (co)polyester, which is very expensive and time-consuming. Alternatively, the polycondensation can be carried out in a batch reactor which allows for easier constructional modification. However, in said type of reactor, only limited amounts of terephthalate (co)polyesters can be prepared in one batch.

SUMMARY OF THE INVENTION

Therefore, the object underlying the present invention is to provide a method for the combined continuous production of large quantities of at least two different terephthalate (co)polyesters in one single setup.

This object is achieved by the method for the combined production of at least two target products selected from the group consisting of (T1), (T2) and (T3), wherein (T1) is a terephthalate polyester,
(T2) is a copolyester on the basis of terephthalic acid, at least one aliphatic 1,ω-dicarboxylic acid and at least one aliphatic 1,ω-diol, and
(T3) is a copolyester on the basis of terephthalic acid, polytetramethylene glycol and at least one aliphatic 1,ω-diol,
in a plant comprising
a first container (B1), a second container (B2), a third container (B3) and a main reactor (HR), wherein
the main reactor (HR) comprises a first main reactor unit (R1), a third main reactor unit (R3) and optionally a second main reactor unit (R2) and, wherein
a pipe (1) connects the first container (B1) to the main reactor units (R1), (R3) and optionally (R2), wherein
pipe (1) is divided into pipes (1a), (1c) and optionally (1b), wherein
pipe (1a) is connected to the inlet of the first main reactor unit (R1), pipe (1c) is connected to the inlet of the third main reactor unit (R3), and optionally, pipe (1b) is connected to the inlet of the second main reactor unit (R2), wherein
a pipe (6a) is connected to the outlet of the first main reactor unit (R1), a pipe (6c) is connected to the outlet of the third main reactor unit (R3), and optionally, a pipe (6b) is connected to the outlet of the second main reactor unit (R2), wherein
the second container (B2) can be connected to the inlet of the first main reactor unit (R1) via a pipe (2), wherein the pipe (2) is connected to pipe (1a), and
the third container (B3) can be connected to the first container (B1) via a pipe (3a) and a pipe (3c),
the method comprising the steps of
a) providing at least one first oligomer composition (OC1) comprising at least one first oligomer (O1) obtained by the condensation reaction of terephthalic acid and at least one aliphatic 1,ω-diol in the first container (B1),
b) providing at least one second oligomer composition (OC2) comprising at least one second oligomer (O2) obtained by the condensation reaction of at least one aliphatic 1,ω-dicarboxylic acid and at least one aliphatic 1,ω-diol in the second container (B2),
c) providing at least one third oligomer composition (OC3) comprising at least one third oligomer (O3) obtained by the polymerization of tetra methylene oxide in the third container (B3),

BRIEF DESCRIPTION OF THE DRAWINGS

The FIGURE shows an embodiment of the inventive plant for the combined production of target products.

DETAILED DESCRIPTION OF THE INVENTION e) performing alternatingly at least two of the following operation modes selected from the group consisting of (PT1), (PT2) and (PT3):
(PT1) production of target product (T1):
a) supplying the at least one first oligomer composition (OC1) via pipes (1), (1a), (1c) and optionally (1b) to the main reactor units (R1), (R3) and optionally (R2),
b) polycondensation of the at least one first oligomer composition (OC1) in the main reactor units (R1), (R3) and optionally (R2), wherein the target product (T1) is obtained, c) removing the target product (T1) from the main reactor units (R1), (R3) and optionally (R2) via pipes (6a), (6c) and optionally (6b), (PT2) simultaneous production of target products (T1) and (T2):
  a) supplying the at least one first oligomer composition (OC1) via pipes (1), (1a), (1c) and optionally (1b) to the main reactor units (R1), (R3) and optionally (R2), and
  b) supplying the at least one second oligomer composition (OC2) via pipes (2) and (1a) to the first main reactor unit (R1),
  c) polycondensation of the at least one first oligomer composition (OC1) and the at least one second oligomer composition (OC2) in the main reactor unit (R1), wherein the target product (T2) is obtained, and polycondensation of the at least one first oligomer composition (OC1) in main reactor units (R3) and optionally (R2), wherein the target product (T1) is obtained,
  d) removing target product (T2) from the main reactor unit (R1) via pipe (6a), and removing target product (T1) from the main reactor units (R3) and optionally (R2) via pipes (6c) and optionally (6b), (PT3) production of target product (T3):
  a) supplying the at least one third oligomer composition (OC3) via pipes (3a) and (3c) to the first container (B1),
  b) mixing the at least one third oligomer composition (OC3) and the at least one first oligomer composition (OC1) in the first container (B1), wherein a product (P1) is obtained comprising the at least one third oligomer composition (OC3) and the at least one first oligomer composition (OC1) in reacted form,
  c) supplying the product (P1) via pipes (1), (1a), (1c) and optionally (1b) to the main reactor units (R1), (R3) and optionally (R2),
  d) polycondensation of the product (P1) in the main reactor units (R1), (R3) and optionally (R2), wherein the target product (T3) is obtained,
  e) removing the target product (T3) from the main reactor units (R1), (R3) and optionally (R2) via pipes (6a), (6c) and optionally (6b).

It has surprisingly been found that the inventive method allows for the combined continuous production of at least two target products selected from the group consisting of (T1), (T2) and (T3), wherein (T1) is a terephthalate polyester, (T2) is a copolyester on the basis of terephthalic acid, at least one aliphatic 1,ω dicarboxylic acid and at least one aliphatic 1,ω-diol, and (T3) is a copolyester on the basis of terephthalic acid, polytetramethylene glycol and at least one aliphatic 1,ω-diol. Further, the inventive method even allows for the simultaneous production of target products, for example, the simultaneous production of target products (T1) and (T2).

Moreover, it has also surprisingly been found that by the inventive method the at least two target products can be prepared at a similar pressure and temperature range. As a result, no constructional modification of the reactors is required.

Furthermore, the at least two target products can be prepared in large quantities.

If desired, the plant for the inventive method can be expanded by further containers and pipes to obtain additional target products selected from terephthalate (co)polyesters. This makes the inventive method very versatile and simple-to-use.

The present invention will be described in more detail hereinafter.

Plant

According to the invention, at least two target products are combinedly produced in a plant.

The plant comprises a first container (B1), a second container (B2) and a third container (B3). Optionally, the plant further comprises a fourth container (B4) and/or a fifth container (B5).

In the first container (B1), at least one first oligomer composition (OC1) is provided.

In the second container (B2), at least one second oligomer composition (OC2) is provided.

In the third container (B3), at least one third oligomer composition (OC3) is provided.

In case the plant further comprises a fourth container (B4), in the fourth container (B4), at least one fourth oligomer composition (OC4) is provided.

In case the plant further comprises a fifth container (B5), in the fifth container (B5), at least one fifth oligomer composition (OC5) is provided.

Suitable containers include, but are not limited to, heated vessels or reactors. If the container is a reactor, it is preferably a continuous reactor. Examples for continuous reactors are tubular reactors, fixed bed reactors, fluid bed reactors or stirred tank reactors.

In case the container is a heated vessel, the at least one oligomer composition is preferably prepared before entering the heated vessel.

In case the container is a reactor, the at least one oligomer composition is preferably prepared in said reactor.

The plant further comprises a main reactor (HR).

The main reactor (HR) comprises a first main reactor unit (R1), a third main reactor unit (R3) and optionally a second main reactor unit (R2). Preferably, the main reactor (HR) is selected from reactors having a horizontal flow direction or from reactors having a vertical flow direction.

The present invention accordingly also provides a method, wherein the main reactor (HR) is selected from reactors having a horizontal flow direction or from reactors having a vertical flow direction.

Examples for reactors having a horizontal flow direction are rotating cage reactors, rotating disc reactors and kneaders, examples for reactors having a vertical flow direction are wiped falling film evaporators and preferably multi tube thin film evaporators.

According to the invention, a pipe (1) connects the first container (B1) to the main reactor units (R1), (R3) and optionally (R2). The pipe (1) is divided into pipes (1a), (1c) and optionally (1b).

Pipe (1a) is connected to the inlet of the first main reactor unit (R1), pipe (1c) is connected to the inlet of the third main reactor unit (R3), and optionally, pipe (1b) is connected to the inlet of the second main reactor unit (R2).

Further, a pipe (6a) is connected to the outlet of the first main reactor unit (R1), a pipe (6c) is connected to the outlet of the third main reactor unit (R3), and optionally a pipe (6b) is connected to the outlet of the second main reactor unit (R2).

The second container (B2) can be connected to the inlet of the first main reactor unit (R1) via a pipe (2), wherein the pipe (2) is connected to pipe (1a).

The third container (B3) can be connected to the first container (B1) via a pipe (3a) and a pipe (3c) or it can be connected to the inlet of the third main reactor unit (R3) via a pipe (3b) and a pipe (3c), wherein the pipe (3b) is connected to pipe (1c).

Further, a fourth container (B4) is optionally connected to the inlet of the first main reactor unit (R1) via a pipe (4), wherein the pipe (4) is connected to pipe (1a).

A fifth container (B5) is optionally connected to the inlet of the third main reactor unit (R3) via a pipe (5), wherein the pipe (5) is connected to pipe (3b) and pipe (3b) is connected to pipe (1c).

Preferably, pipes (2), (3a), (3b), (3c) and (4) comprise valves. Pipe (2) preferably comprises a valve (V2), pipe (3a) a valve (V3a), pipe (3b) a valve (V3b), pipe (3c) a valve (V3c) and pipe (4) a valve (V4).

In a preferred embodiment, the valve (V3b) is a 3-way valve.

The valves may be open or closed.

In case valve (V2) is open, the at least one second oligomer composition (OC2) can be supplied via pipes (2) and (1a) to the inlet of the first main reactor unit (R1). In case valve (V2) is closed, the at least one second oligomer composition (OC2) cannot be supplied from the second container (B2) via pipes (2) and (1a) to the inlet of the first main reactor unit (R1).

In case valves (V3a) and (V3c) are open, the at least one third oligomer composition (OC3) can be supplied via pipes (3a) and (3c) to the first container (B1). In case valves (V3a) and (V3c) are closed, the at least one third oligomer composition (OC3) cannot be supplied from the third container (B3) via pipes (3a) and (3c) to the first container (B1).

In case valves (V3b) and (V3c) are open, the at least one third oligomer composition (OC3) can be supplied via pipes (3b), (3c) and (1c) to the inlet of the third main reactor unit (R3). In case only valve (V3b) is open, the at least one fifth oligomer composition (OC5) can be supplied via pipes (5), (3b) and (1c) to the inlet of the third main reactor unit (R3). In case valve (V3b) is closed neither the at least one third oligomer composition (OC3) can be supplied via pipes (3b) and (1c) from the third container (B3) nor the at least one fifth oligomer composition (OC5) can be supplied via pipes (5), (3b) and (1c) from the fifth container (B5) to the inlet of the third main reactor unit (R3).

In case valve (V4) is open, the at least one fourth oligomer composition (OC4) can be supplied via pipes (4) and (1a) to the inlet of the first main reactor unit (R1). In case valve (V4) is closed, the at least one fourth oligomer composition (OC4) cannot be supplied from the fourth container (B4) via pipes (4) and (1a) to the inlet of the first main reactor unit (R1).

In case valve (V3b) is open for supplying the at least one fifth oligomer composition (OC5) to main reactor unit (R3), valve (V3c) is closed for supplying the at least one third oligomer composition (OC3) to main reactor unit (R3).

In case valves (V3b) and (V3a) are open, and valve (V3c) is closed, it is also possible to supply the at least one fifth oligomer composition (OC5) via pipes (5) and (3a) to the first container (B1).

Further, in case valves (V3b) and (V3c) are open for supplying the at least one third oligomer composition (OC3) to main reactor unit (R3), valve (V3b) is either closed for supplying the at least one fifth oligomer composition (OC5) or it is open to simultaneously supply the at least one fifth oligomer composition (OC5) to main reactor unit (R3). In this case valve (V3a) is closed.

In the FIGURE, an embodiment of the inventive plant for the combined production of the target products is shown. The plant comprises a first container (B1), a second container (B2), a third container (B3), a fourth container (B4), and a fifth container (B5), wherein the fourth container (B4) and the fifth container (B5) are optional. The plant further comprises a main reactor (HR), wherein the main reactor (HR) comprises a first main reactor unit (R1), a second main reactor unit (R2) and a third main reactor unit (R3), wherein the second main reactor unit (R2) is optional. A pipe (1) connects the first container (B1) to the main reactor units (R1), (R3) and optionally (R2), wherein the pipe (1) is divided into pipes (1a), (1c) and optionally (1b) and pipe (1a) is connected to the inlet of the first main reactor unit (R1), pipe (1b) is connected to the inlet of the second main reactor unit (R2) and pipe (1c) is connected to the inlet of the third main reactor unit (R3). A pipe (6a) is connected to the outlet of the first main reactor unit (R1), an optional pipe (6b) is connected to the outlet of the optional second main reactor unit (R2) and a pipe (6c) is connected to the outlet of the third main reactor unit (R3). The second container (B2) is connected to the inlet of the first main reactor unit (R1) via a pipe (2), wherein pipe (2) is connected to pipe (1a). The third container (B3) is connected to the first container (B1) via a pipe (3a) and a pipe (3c). The third container (B3) is also connected to the inlet of the third main reacot runit (R3) via a pipe (3B) and pipe (3c), wherein the pipe (3b) is connected to pipe (1c). The fourth container (B4) is connected to the inlet of the first main reactor unit (R1) via a pipe (4), wherein the pipe (4) is connected to pipa (1a). The fifth container (B5) is connected to the inlet of the third main reactor unit (R3) via a pipe (5), wherein the pipe (5) is connected to pipe (3b), and pipe (3b) is connected to pipe (1c). Pipes (2), (3a), (3b), (3c) and (4) comprise valves. Pipe (2) comprises a valve (V2), pipe (3a) comprises a valve (V3a), pipe (3b) comprises a valve (V3b), pipe (3c) comprises a valve (V3c) and pipe (4) comprises a valve (V4). The valve (V3b) is preferably a 3-way valve.

First Oligomer Composition (OC1)

In the first container (B1) at least one first oligomer composition (OC1) is provided. What is meant by "at least one first oligomer composition (OC1)" is precisely one first oligomer composition (OC1) as well as mixtures of two or more first oligomer compositions (OC1).

The at least one first oligomer composition (OC1) comprises at least one first oligomer (O1). What is meant by "at least one first oligomer (O1)" is precisely one first oligomer (O1) as well as mixtures of two or more first oligomers (O1).

The at least one first oligomer composition (OC1) preferably comprises at least 94% by weight, more preferably at least 96.5% by weight and most preferably at least 98.8% by weight of the at least one first oligomer (O1), based on the total weight of the first oligomer composition (OC1).

Likewise, the at least one first oligomer composition (OC1) preferably comprises not more than 99.98% by weight, more preferably not more than 99.92% by weight and most preferably not more than 99.85% by weight of the at least one first oligomer (O1), based on the total weight of the first oligomer composition (OC1).

In a preferred embodiment, the at least one first oligomer composition (OC1) comprises from 94 to 99.98% by weight, preferably from 96.5 to 99.92% by weight and especially from 98.8 to 99.85% by weight of the at least one first oligomer (O1), based on the total weight of the first oligomer composition (OC1).

The at least one first oligomer composition (OC1) can also comprise at least one additive (A), which is preferably at least one antioxidant. What is meant by "at least one antioxidant" is precisely one antioxidant as well as mixtures of two or more antioxidants.

Suitable antioxidants include, but are not limited to, sterically hindered phenols, secondary aromatic amines, hydroquinones, resorcinols, vitamin E or analogous-structure compounds, copper(I) halides, hindered amine light stabilizers ("HALS"), quenchers, such as nickel quenchers, hydroperoxide decomposers, triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones and salicylates.

The at least one first oligomer composition (OC1) preferably comprises at least 0.01% by weight, more preferably at least 0.05% by weight and most preferably at least 0.1% by weight of the at least one antioxidant, based on the total weight of the first oligomer composition (OC1).

Likewise, the at least one first oligomer composition (OC1) preferably comprises not more than 5% by weight, more preferably not more than 3% by weight and most preferably not more than 1% by weight of the at least one antioxidant, based on the total weight of the first oligomer composition (OC1).

In a preferred embodiment, the at least one first oligomer composition (OC1) comprises from 0.01 to 5% by weight, preferably from 0.05 to 3% by weight and especially from 0.1 to 1% by weight of the at least one antioxidant, based on the total weight of the first oligomer composition (OC1).

The at least one first oligomer composition (OC1) can also comprise at least one catalyst (C). What is meant by "at least one catalyst (C)" is precisely one catalyst (C) as well as mixtures of two or more catalysts (C).

Preferably, the at least one catalyst (C) is selected from the group consisting of Lewis acid metal compounds.

Lewis acid metal compounds are known to the skilled person. Examples for Lewis acid metal compounds are tetrabutyl orthotitanate (TBOT), triisopropyl titanate and tin dioctoate.

In a preferred embodiment, the at least one catalyst (C) is tetrabutyl orthotitanate (TBOT).

The at least one first oligomer composition (OC1) preferably comprises at least 0.01% by weight, more preferably at least 0.03% by weight and most preferably at least 0.05% by weight of the at least one catalyst (C), based on the total weight of the first oligomer composition (OC1).

Likewise, the at least one first oligomer composition (OC1) preferably comprises not more than 1% by weight, more preferably not more than 0.5% by weight and most preferably not more than 0.2% by weight of the at least one catalyst (C), based on the total weight of the first oligomer composition (OC1).

In a preferred embodiment, the at least one first oligomer composition (OC1) comprises from 0.01 to 1% by weight, preferably from 0.03 to 0.5% by weight and especially from 0.05 to 0.2% by weight of the at least one catalyst (C), based on the total weight of the first oligomer composition (OC1).

The percent by weight of the at least one first oligomer (O1), the at least one antioxidant and the at least one catalyst (C) in the oligomer composition (OC1) generally add up to 100%.

The at least one first oligomer composition (OC1) has preferably an OH number in the range from 30 to 80 mg KOH/g, more preferably in the range from 40 to 80 mg KOH/g, and most preferably in the range from 50 to 80 mg KOH/g according to DIN 53240, part 2.

The present invention therefore also provides a method, wherein the at least one first oligomer composition (OC1) has an OH number in the range from 30 to 80 mg KOH/g.

The at least one first oligomer (O1) is obtained by the condensation reaction of terephthalic acid and at least one aliphatic 1,ω-diol. In other words, the at least one first oligomer (O1) is the condensation product of terephthalic acid and at least one aliphatic 1,ω-diol.

The at least one first oligomer (O1) is preferably the condensation product of
i) 100 mol %, based on component i), of terephthalic acid, and
ii) 100 to 104 mol %, based on component i), of at least one aliphatic 1,ω-diol.

However, it is also possible to use at least one aromatic 1,ω-dicarboxylic acid different from terephthalic acid, for example, phthalic acid, 2,5-furandicarboxylic acid, 2,6-naphthalenedicarboxylic acid or 1,5-naphthalenedicarboxylic acid, or a combination of terephthalic acid and at least one different aromatic 1,ω-dicarboxylic acid.

In this case, the at least one first oligomer (O1) is preferably the condensation product of
i) 100 mol %, based on component i), of at least one aromatic 1,ω-dicarboxylic acid, and
ii) 100 to 104 mol %, based on component i), of at least one aliphatic 1,ω-diol.

Within the context of the present invention, the term "aromatic 1,ω-dicarboxylic acid" comprises the aromatic 1,ω-dicarboxylic acids themselves as well as the derivatives of the aromatic 1,ω-dicarboxylic acids such as the aromatic 1,ω-dicarboxylic esters. Suitable aromatic 1,ω-dicarboxylic esters are the di-$C_1$-$C_6$-alkyl esters of the aromatic 1,ω-dicarboxylic acids such as the di-methyl-, di-ethyl-, di-n-propyl-, di-iso-propyl-, di-n-butyl-, di-iso-butyl-, di-t-butyl-, di-n-pentyl-, di-iso-pentyl- or di-n-hexyl esters of the aromatic 1,ω-dicarboxylic acids.

"At least one aliphatic 1,ω-diol" means precisely one aliphatic 1,ω-diol as well as mixtures of two or more aliphatic 1,ω-diols. In a preferred embodiment, the at least one first oligomer (O1) is obtained by the condensation reaction of terephthalic acid and precisely one aliphatic 1,ω-diol.

Aliphatic 1,ω-diols are known per se.

Examples for aliphatic 1,ω-diols are 1,2-ethanediol, 1,3-propanediol, 1,4-butanediol, 1,5-pentanediol, 1,6-hexanediol, 2,2-dimethyl-1,3-propanediol, 2-ethyl-2-butyl-1,3-propanediol, 2-ethyl-2-isobutyl-1,3-propanediol, 1,4-cyclohexane-dimethanol, 2,2,4-trimethyl-1,6-hexanediol or diethylene glycol.

For the purpose of the present invention, the at least one aliphatic 1,ω-diol is preferably selected from aliphatic 1,ω-diols having 2 to 12, more preferably from aliphatic 1,ω-diols having 4 to 6, carbon atoms. The aliphatic 1,ω-diols can be linear or branched.

In a preferred embodiment, the at least one aliphatic 1,ω-diol is selected from the group consisting of 1,2-ethanediol, 1,3-propanediol, 1,4-butanediol and diethylene glycol, more preferably the at least one aliphatic 1,ω-diol is 1,2-ethanediol or 1,4-butanediol.

The present invention accordingly also provides a method, wherein the at least one aliphatic 1,ω-diol is selected from the group consisting of 1,2-ethanediol, 1,3-propanediol, 1,4-butanediol and diethylene glycol.

It is clear for the skilled person that also the above-mentioned esters of the aromatic 1,ω-dicarboxylic acids can be used. The esters of the above-mentioned aromatic 1,ω-dicarboxylic acids can be used individually as well as in the form of mixtures of two or more esters of the aromatic 1,ω-dicarboxylic acids.

In addition, a mixture of at least one aromatic 1,ω-dicarboxylic acid and at least one ester of an aromatic 1,ω-dicarboxylic acid may also be used.

The weight average molecular weight ($M_w$) of the at least one first oligomer (O1) is customarily in the range from 200 to 2200 g/mol, preferably in the range from 400 to 2000 g/mol, and more preferably in the range from 600 to 1800 g/mol. The weight average molecular weight ($M_w$) is determined according to ASTM D4001.

Second Oligomer Composition (OC2)

In the second container (B2) at least one second oligomer composition (OC2) is provided. What is meant by "at least one second oligomer composition (OC2)" is precisely one second oligomer composition (OC2) as well as mixtures of two or more second oligomer compositions (OC2).

The at least one second oligomer composition (OC2) comprises at least one second oligomer (O2). What is meant by "at least one second oligomer (O2)" is precisely one second oligomer (O2) as well as mixtures of two or more second oligomers (O2).

The at least one second oligomer composition (OC2) preferably comprises at least 94% by weight, more preferably at least 96.5% by weight and most preferably at least 98.8% by weight of the at least one second oligomer (O2), based on the total weight of the second oligomer composition (OC2).

Likewise, the at least one second oligomer composition (OC2) preferably comprises not more than 99.98% by weight, more preferably not more than 99.92% by weight and most preferably not more than 99.85% by weight of the at least one second oligomer (O2), based on the total weight of the at least one second oligomer composition (OC2).

In a preferred embodiment, the at least one second oligomer composition (OC2) comprises from 94 to 99.98% by weight, preferably from 96.5 to 99.92% by weight and especially from 98.8 to 99.85% by weight of the at least one second oligomer (O2), based on the total weight of the second oligomer composition (OC2).

The at least one second oligomer composition (OC2) can also comprise at least one additive (A), which is preferably at least one antioxidant. What is meant by "at least one antioxidant" is precisely one antioxidant as well as mixtures of two or more antioxidants.

Further, the at least one second oligomer composition (OC2) can also comprise at least one catalyst (C). What is meant by "at least one catalyst (C)" is precisely one catalyst (C) as well as mixtures of two or more catalysts (C).

The abovementioned embodiments and preferences with respect to the at least one antioxidant and the at least one catalyst (C) comprised in the at least one first oligomer composition (OC1) apply analogously to the at least one antioxidant and the at least one catalyst (C) comprised in the at least one second oligomer composition (OC2).

The percent by weight of the at least one second oligomer (O2), the at least one antioxidant and the at least one catalyst (C) in the oligomer composition (OC2) generally add up to 100%.

Preferably, the at least one second oligomer composition (OC2) has an OH number in the range from 30 to 80 mg KOH/g according to DIN 53240, part 2.

The present invention therefore also provides a method, wherein the at least one second oligomer composition (OC2) has an OH number in the range from 30 to 80 mg KOH/g.

The at least one second oligomer (O2) is obtained by the condensation reaction of at least one aliphatic 1,ω-dicarboxylic acid and at least one aliphatic 1,ω-diol. In other words, the at least one second oligomer (O2) is the condensation product of the at least one aliphatic 1,ω-dicarboxylic acid and the at least one aliphatic 1,ω-diol.

The at least one second oligomer (O2) is preferably the condensation product of
i) 100 mol %, based on component i), of at least one aliphatic 1,ω-dicarboxylic acid, and
iii) 100 to 106 mol %, based on component i), of at least one aliphatic 1,ω-diol.

"At least one aliphatic 1,ω-diol" means precisely one aliphatic 1,ω-diol as well as mixtures of two or more aliphatic 1,ω-diols.

The above-mentioned embodiments and preferences with respect to the at least one aliphatic 1,ω-diol apply analogously to the at least one aliphatic 1,ω-diol mentioned hereunder.

"At least one aliphatic 1,ω-dicarboxylic acid" means precisely one aliphatic 1,ω-dicarboxylic acid as well as mixtures of two or more aliphatic 1,ω-dicarboxylic acids. In a preferred embodiment, the at least one second oligomer (O2) is obtained by the condensation reaction of precisely one aliphatic 1,ω-dicarboxylic acid and precisely one aliphatic 1,ω-diol.

Aliphatic 1,ω-dicarboxylic acids are known to a skilled person.

Preferably, the at least one aliphatic 1,ω-dicarboxylic acid is selected from aliphatic 1,ω-dicarboxylic acids having 2 to 40 carbon atoms, more preferably from aliphatic 1,ω-dicarboxylic acids having 4 to 17 carbon atoms. The aliphatic 1,ω-dicarboxylic acids can be linear or branched.

Within the context of the present invention, the term "aliphatic 1,ω-dicarboxylic acids" comprises the aliphatic 1,ω-dicarboxylic acids themselves as well as the derivatives of the aliphatic 1,ω-dicarboxylic acids such as the aliphatic 1,ω-dicarboxylic esters. Suitable aliphatic 1,ω-dicarboxylic esters are the di-$C_1$-$C_6$-alkyl esters of the aliphatic 1,ω-dicarboxylic acids such as the di-methyl-, di-ethyl-, di-n-propyl-, di-iso-propyl-, di-n-butyl-, di-iso-butyl-, di-t-butyl-, di-n-pentyl-, di-iso-pentyl- or di-n-hexyl esters of the aliphatic 1,ω-dicarboxylic acids.

Examples for aliphatic 1,ω-dicarboxylic acids are malonic acid, succinic acid, 2-methyl succinic acid, glutaric acid, 2-methyl glutaric acid, 3-methyl glutaric acid, adipic acid, pimelic acid, cork acid, azelaic acid, sebacic acid, undecanedioic acid, dodecandioic acid, brassic acid, tetradecandioic acid, fumaric acid, 2,2-dimethylglutaric acid, dimer fatty acid (such as EMPOL® 1061 from Cognis), 1,3-cyclopentanedicarboxylic acid, diglycolic acid, itaconic acid, maleic acid or 2,5-norbornendicarboxylic acid.

Particularly preferred aliphatic 1,ω-dicarboxylic acids are succinic acid, glutaric acid, adipic acid, azelaic acid, sebacic acid or brassic acid, especially preferred are succinic acid, adipic acid or sebacic acid.

The present invention therefore also provides a method, wherein the at least one aliphatic 1,ω-dicarboxylic acid is selected from the group consisting of succinic acid, adipic acid and sebacic acid.

In a preferred embodiment of the present invention the aliphatic 1,ω-dicarboxylic acid is adipic acid.

It is clear for the skilled person that also the above-mentioned esters of the aliphatic 1,ω-dicarboxylic acids can be used. The esters of the above-mentioned aliphatic 1,ω-dicarboxylic acids can be used individually as well as in the form of mixtures of two or more esters of the aliphatic 1,ω-dicarboxylic acids.

In addition, a mixture of at least one aliphatic 1,ω-dicarboxylic acid and at least one ester of an aliphatic 1,ω-dicarboxylic acid may also be used.

The weight average molecular weight ($M_w$) of the at least one second oligomer (O2) is customarily in the range from 200 to 2600 g/mol, preferably in the range from 400 to 2400 g/mol, and especially preferably in the range from 500 to 2000 g/mol. The weight average molecular weight ($M_w$) is determined according to ASTM D4001.

Third Oligomer Composition (OC3)

In the third container (B3) at least one third oligomer composition (OC3) is provided. What is meant by "at least one third oligomer composition (OC3)" is precisely one third oligomer composition (OC3) as well as mixtures of two or more third oligomer compositions (OC3).

The at least one third oligomer composition (OC3) comprises at least one third oligomer (O3). What is meant by "at least one third oligomer (O3)" is precisely one third oligomer (O3) as well as mixtures of two or more third oligomers (O3).

The at least one third oligomer composition (OC3) preferably comprises at least 94% by weight, more preferably at least 96.5% by weight and most preferably at least 98.8% by weight of the at least one third oligomer (O3), based on the total weight of the third oligomer composition (OC3).

Likewise, the at least one third oligomer composition (OC3) preferably comprises not more than 99.98% by weight, more preferably not more than 99.92% by weight and especially preferably not more than 99.85% by weight of the at least one third oligomer (O3), based on the total weight of the at least one third oligomer composition (OC3).

In a preferred embodiment, the at least one third oligomer composition (OC3) comprises from 94 to 99.98% by weight, preferably from 96.5 to 99.92% by weight and especially from 98.8 to 99.85% by weight of the at least one third oligomer (O3), based on the total weight of the third oligomer composition (OC3).

The at least one third oligomer composition (OC3) can also comprise at least one additive (A), which is preferably at least one antioxidant. What is meant by "at least one antioxidant" is precisely one antioxidant as well as mixtures of two or more antioxidants.

Further, the at least one third oligomer composition (OC3) can also comprise at least one catalyst (C). What is meant by "at least one catalyst (C)" is precisely one catalyst (C) as well as mixtures of two or more catalysts (C).

The abovementioned embodiments and preferences with respect to the at least one antioxidant and the at least one catalyst (C) comprised in the at least one first oligomer composition (OC1) apply analogously to the at least one antioxidant and the at least one catalyst (C) comprised in the at least one third oligomer composition (OC3).

The percent by weight of the at least one third oligomer (O3), the at least one antioxidant and the at least one catalyst (C) in the third oligomer composition (OC3) generally add up to 100%.

The at least one third oligomer (O3) is obtained by the polymerization of tetra methylene oxide. In other words, the at least one third oligomer (O3) is the polymerization product of tetra methylene oxide (polytetramethylene glycol).

However, it is also possible to use polycaprolactonediols or polycarbonatediols as the at least one third oligomer (O3). Polytetramethylene glycol is preferred.

The weight-average molecular weight (Mw) of the at least one third oligomer (O3) is generally in the range from 600 to 2400 g/mol, preferably in the range from 600 to 2000 g/mol and more preferably in the range from 1200 to 2000 g/mol. The weight-average molecular weight (Mw) is measured using gel permeation chromatography (GPC). Dimethylacetamide (DMAc) was used as solvent and narrowly distributed polymethyl methacrylate was used as standard in the measurement.

The present invention therefore also provides a method, wherein the at least one third oligomer (O3) has a weight-average molecular weight ($M_w$) in the range from 600 to 2400 g/mol.

Fourth Oligomer Composition (OC4)

In case the plant further comprises a fourth container (B4), at least one fourth oligomer composition (OC4) is provided in this fourth container (B4). What is meant by "at least one fourth oligomer composition (OC4)" is precisely one fourth oligomer composition (OC4) as well as mixtures of two or more fourth oligomer compositions (OC4).

The at least one fourth oligomer composition (OC4) comprises at least one fourth oligomer (O4). What is meant by "at least one fourth oligomer (O4)" is precisely one fourth oligomer (O4) as well as mixtures of two or more fourth oligomers (O4).

The at least one fourth oligomer composition (OC4) preferably comprises at least 94% by weight, more preferably at least 96.5% by weight and most preferably at least 98.8% by weight of the at least one fourth oligomer (O4), based on the total weight of the fourth oligomer composition (OC4).

Likewise, the at least one fourth oligomer composition (OC4) preferably comprises not more than 99.98% by weight, more preferably not more than 99.92% by weight and most preferably not more than 99.85% by weight of the at least one fourth oligomer (O4), based on the total weight of the at least one fourth oligomer composition (OC4).

In a preferred embodiment, the at least one fourth oligomer composition (OC4) comprises from 94 to 99.98% by weight, preferably from 96.5 to 99.92% by weight and especially from 98.8 to 99.85% by weight of the at least one fourth oligomer (O4), based on the total weight of the fourth oligomer composition (OC4).

The at least one fourth oligomer composition (OC4) can also comprise at least one antioxidant. What is meant by "at least one antioxidant" is precisely one antioxidant as well as mixtures of two or more antioxidants.

Further, the at least one fourth oligomer composition (OC4) can also comprise at least one catalyst (C). What is meant by "at least one catalyst (C)" is precisely one catalyst (C) as well as mixtures of two or more catalysts (C).

The above-mentioned embodiments and preferences with respect to the at least one antioxidant and the at least one catalyst (C) comprised in the at least one first oligomer composition (OC1) apply analogously to the at least one antioxidant and the at least one catalyst (C) comprised in the at least one fourth oligomer composition (OC4).

The percent by weight of the at least one fourth oligomer (O4), the at least one antioxidant and the at least one catalyst (C) in the at least one oligomer composition (OC4) generally add up to 100%.

The at least one fourth oligomer (O4) is obtained by melting of at least one polyesterol.

What is meant by "at least one polyesterol" is precisely one polyesterol as well as mixtures of two or more polyesterols.

Polyesterols are known per se. They are also referred to as "polyester polyols", "polyester alcohols" or the abbreviation "PESOL".

For the purpose of the present invention, the at least one polyesterol is preferably the polycondensation product of
i) at least one aromatic and/or aliphatic 1,ω-dicarboxylic acid, and ii) at least one 1,ω-glycol and/or at least one polyhydroxy compound.

The present invention therefore also provides a method, wherein the at least one polyesterol is the polycondensation product of
i) at least one aromatic and/or aliphatic 1,ω-dicarboxylic acid, and
ii) at least one 1,ω-glycol and/or at least one polyhydroxy compound.

What is meant by "at least one aromatic 1,ω-dicarboxylic acid" is precisely one aromatic 1,ω-dicarboxylic acid as well as mixtures of two or more aromatic 1,ω-dicarboxylic acids.

Preferably, the at least one aromatic 1,ω-dicarboxylic acid is selected from the group consisting of aromatic 1,ω-dicarboxylic acids having from 8 to 12 carbon atoms, more preferably from those having 8 carbon atoms. In principle, it is also possible to use aromatic 1,ω-dicarboxylic acids having a greater number of carbon atoms, for example up to 20 carbon atoms.

Examples for suitable aromatic 1,ω-dicarboxylic acids are terephthalic acid, isophthalic acid, 2,6-naphthoic acid, 1,5-naphthoic acid, phthalic acid and 2,5-furandicarboxylic acid, and also ester-forming derivatives of these. Suitable ester-forming derivatives are the di-$C_1$-$C_6$-alkylesters of these, e.g. the dimethyl-, di-ethyl-, di-n-propyl-, di-iso-propyl-, di-n-butyl-, di-iso-butyl-, di-tert-butyl-, di-n-pentyl-, di-iso-pentyl- or di-n-hexyl-esters of the aromatic 1,ω-dicarboxylic acids. The anhydrides of the aromatic α,β-dicarboxylic acids are also suitable ester-forming derivatives.

The aromatic 1,ω-dicarboxylic acids or ester-forming derivatives of these may be used individually or as a mixture of two or more of these. It is particularly preferable to use terephthalic acid or its ester-forming derivatives, such as dimethyl terephthalate.

What is meant by "at least one aliphatic 1,ω-dicarboxylic acid" is precisely one aliphatic 1,ω-dicarboxylic acid as well as mixtures of two or more aliphatic 1,ω-dicarboxylic acids.

The above-mentioned embodiments and preferences with respect to the at least one aliphatic 1,ω-dicarboxylic acid apply analogously to the at least one aliphatic 1,ω-dicarboxylic acid mentioned hereunder.

The at least one polyesterol can be the polycondensation product of
i) at least one aromatic and/or aliphatic 1,ω-dicarboxylic acid, and
ii) at least one 1,ω-glycol and/or at least one polyhydroxy compound.

What is meant by "at least one 1,ω-glycol" is precisely one 1,ω-glycol as well as mixtures of two or more 1,ω-glycols.

What is meant by "at least one polyhydroxy compound" is precisely one polyhydroxy compound as well as mixtures of two or more polyhydroxy compounds.

1,ω-glycols are known to the skilled person. The 1,ω-glycols can be used as chain builder.

For the purpose of the present invention, a polyhydroxy compound means a compound having more than two hydroxyl groups per molecule.

Polyhydroxy compounds are known to the skilled person. They may be monomeric, oligomeric or polymeric.

Examples for polyhydroxy compounds are polyvalent alcohols, polyalkylene glycols and polyesters.

Suitable polyvalent alcohols are triols and tetrols such as propane-1,2,3-triol, trimethylolpropane or pentaerythritol.

Triols and tetrols can be used as branching agent.

Suitable polyesters are the polymerization products of the above-mentioned aromatic or aliphatic 1,ω-dicarboxylic acids and the above-mentioned aliphatic 1,ω-diols and optionally the above-mentioned polyvalent alcohols.

The weight-average molecular weight ($M_w$) of the polyesterol is preferably in the range from 200 to 2400 g/mol, more preferably in the range from 300 to 2000 g/mol, most preferably in the range from 400 to 1800 g/mol. The number-average molecular weight is preferably determined by gel permeation chromatography using polystyrene as standard and THF as eluent/solvent. The weight average molecular weight ($M_w$) is determined according to ASTM D4001.

The at least one polyesterol is preferably molten at temperatures of below 150° C., more preferably of below 100° C., most preferably of below 60° C.

The weight average molecular weight ($M_w$) of the at least one fourth oligomer (O4) is customarily in the range from 200 to 2600 g/mol, preferably in the range from 300 to 2500 g/mol, and especially preferably in the range from 400 to 2400 g/mol. The weight average molecular weight ($M_w$) is determined according to ASTM D4001.

Fifth Oligomer Composition (OC5)

In case the plant further comprises a fifth container (B5), at least one fifth oligomer composition (OC) is provided in this fifth container (B5). What is meant by "at least one fifth oligomer composition (OC5)" is precisely one fifth oligomer composition (OC5) as well as mixtures of two or more fifth oligomer compositions (OC5).

The at least one fifth oligomer composition (OC5) comprises at least one fifth oligomer (O5). What is meant by "at least one fifth oligomer (O5)" is precisely one fifth oligomer (O5) as well as mixtures of two or more fifth oligomers (O5).

The at least one fifth oligomer composition (OC5) preferably comprises at least 90% by weight, more preferably at least 95% by weight and especially preferably at least 98% by weight of the at least one fifth oligomer (O5), based on the total weight of the oligomer composition (OC5).

Likewise, the at least one fifth oligomer composition (OC5) preferably comprises not more than 100% by weight of the at least one fifth oligomer (O5), based on the total weight of the at least one fifth oligomer composition (OC5).

In a preferred embodiment, the at least one fifth oligomer composition (OC5) comprises from 90 to 100% by weight, preferably from 95 to 100% by weight and especially from 98 to 100% by weight of the at least one fifth oligomer (O5), based on the total weight of the fifth oligomer composition (OC5).

The at least one fifth oligomer composition (OC5) can also comprise at least one additive (A), which is preferably at least one antioxidant. What is meant by "at least one antioxidant" is precisely one antioxidant as well as mixtures of two or more antioxidants.

The at least one first oligomer composition (OC5) preferably comprises not more than 10% by weight, more preferably not more than 5% by weight and most preferably not more than 2% by weight of the at least one antioxidant, based on the total weight of the oligomer composition (OC5).

In a preferred embodiment, the at least one first oligomer composition (OC5) comprises from 0 to 10% by weight, preferably from 0 to 5% by weight and especially from 0 to 2% by weight of the at least one antioxidant, based on the total weight of the oligomer composition (OC5).

The percent by weight of the at least one fifth oligomer (O5) and the at least one antioxidant in the at least one oligomer composition (OC5) generally add up to 100%.

The at least one fifth oligomer (O5) is obtained by the alkoxylation of at least one low molecular weight compound, having 2 to 6 hydroxyl functions, with at least one alkylene oxide being different from tetra methylene oxide. In other words, the at least one fifth oligomer (O5) is the polymerization product of at least one alkylene oxide being different from tetra methylene oxide with at least one low molecular weight compound, having 2 to 6 hydroxyl functions.

Suitable alkylene oxides are ethylene oxide, propylene oxide, butylene oxide, styrene oxide and mixtures thereof.

Therefore, the present invention also provides a method, wherein the at least one alkylene oxide, which is different from tetra methylene oxide, is selected from ethylene oxide, propylene oxide, butylene oxide, styrene oxide and mixtures thereof.

The at least one fifth oligomer (O5) is preferably a block or statistic oligomer comprising polymerized units of ethylene oxide and propylene oxide.

In a preferred embodiment, the at least one fifth oligomer (O5) comprises at least two hydroxy groups, more preferably from 3 to 5 hydroxy groups.

The weight average molecular weight ($M_w$) of the at least one fifth oligomer (O5) is customarily in the range from 200 to 15.000 g/mol, preferably in the range from 500 to 10.000 g/mol, and especially preferably in the range from 800 to 8.000 g/mol. The weight average molecular weight ($M_w$) is determined according to ASTM D4001.

Operation Modes

At least two operation modes selected from the group consisting of (PT1), (PT2) and (PT3) are alternatingly performed. Optionally, also further operation modes, selected from the group consisting of (PT4), (PT5), (PT6), (PT7), (PT8), (PT9) and (PT10) can be alternatingly performed.

PT1

Operation mode (PT1) is the production of target product (T1) and comprises the following steps a) to c):
a) supplying the at least one first oligomer composition (OC1) via pipes (1), (1a), (1c) and optionally (1b) to the main reactor units (R1), (R3) and optionally (R2),
b) polycondensation of the at least one first oligomer composition (OC1) in the main reactor units (R1), (R3) and optionally (R2), wherein the target product (T1) is obtained,
c) removing the target product (T1) from the main reactor units (R1), (R3) and optionally (R2) via pipes (6a), (6c) and optionally (6b).

It is clear for the skilled person that by performing operation mode (PT1), valves (V2), (V3a), (V3b), (V3c) and (V4) are closed.

The polycondensation of the at least one first oligomer composition (OC1) in the main reactor units (R1), (R3) and optionally (R2) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

It is clear for a skilled person that at these temperatures, the at least one first oligomer (O1) in the at least one first oligomer composition (OC1) as well as the target product (T1) are present in the molten form.

The residence time of the at least one first oligomer composition (OC1) in the main reactor units (R1), (R3) and optionally (R2) is usually from 10 to 240 min, preferably from 25 to 180 min.

In general, no further catalyst is added during the polycondensation, but it is possible to add a catalyst, for example, a catalyst as described above, in the condensation reaction of terephthalic acid and at least one aliphatic 1,ω-diol in the main reactor units (R1), (R3) and optionally (R2).

PT2

Operation mode (PT2) is the simultaneous production of target products (T1) and (T2) and comprises the following steps a) to d):
a) supplying the at least one first oligomer composition (OC1) via pipes (1), (1a), (1c) and optionally (1b) to the main reactor units (R1), (R3) and optionally (R2), and
b) supplying the at least one second oligomer composition (OC2) via pipes (2) and (1a) to the first main reactor unit (R1),
c) polycondensation of the at least one first oligomer composition (OC1) and the at least one second oligomer composition (OC2) in the main reactor unit (R1), wherein the target product (T2) is obtained, and polycondensation of the at least one first oligomer composition (OC1) in main reactor units (R3) and optionally (R2), wherein the target product (T1) is obtained,
d) removing target product (T2) from the main reactor unit (R1) via pipe (6a), and removing target product (T1) from the main reactor units (R3) and optionally (R2) via pipes (6c) and optionally (6b).

It is clear for the skilled person that by performing operation mode (PT2), valves (V3a), (V3b), (V3c) and (V4) are closed.

To the polycondensation of the at least one first oligomer composition (OC1) in the reactor units (R3) and optionally (R2), the above-mentioned embodiments and preferences with respect to the polycondensation of the at least one first oligomer composition (OC1) in the reactor units (R1), (R3) and optionally (R2) apply analogously.

The polycondensation of the at least one first oligomer composition (OC1) and the at least one second oligomer composition (OC2) in the main reactor unit (R1) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

It is clear for a skilled person that at these temperatures, the at least one first oligomer (O1) in the at least one first oligomer composition (OC1), the at least one second oligomer (O2) in the at least one second oligomer composition (OC2) as well as the target products (T1) and (T2) are present in the molten form.

PT3

Operation mode (PT3) is the production of target product (T3) and comprises the following steps a) to e):
a) supplying the at least one third oligomer composition (OC3) via pipes (3a) and (3c) to the first container (B1),
b) mixing the at least one third oligomer composition (OC3) and the at least one first oligomer composition (OC1) in the first container (B1), wherein a product (P1) is obtained comprising the at least one third oligomer composition (OC3) and the at least one first oligomer composition (OC1) in reacted form,
c) supplying the product (P1) via pipes (1), (1a), (1c) and optionally (1b) to the main reactor units (R1), (R3) and optionally (R2),
d) polycondensation of the product (P1) in the main reactor units (R1), (R3) and optionally (R2), wherein the target product (T3) is obtained,
e) removing the target product (T3) from the main reactor units (R1), (R3) and optionally (R2) via pipes (6a), (6c) and optionally (6b).

It is clear for a skilled person that by performing operation mode (PT3), valves (V2), (V3b) and (V4) are closed.

The polycondensation of the product (P1) in the main reactor units (R1), (R3) and optionally (R2) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

It is clear for a skilled person that at these temperatures, the product (P1) as well as the target product (T3) are present in the molten form.

PT4

In case a third container (B3) is connected to the inlet of the third main reactor unit (R3) via a pipe (3b) and a pipe (3c), wherein the pipe (3b) is connected to pipe (1c), a further operation mode (PT4) can be performed.

Preferably, operation mode (PT4) is the production of target products (T1) and (T3) and comprises the following steps a) to d):
a) supplying the at least one first oligomer composition (OC1) via pipes (1), (1a), (1c) and optionally (1b) to the main reactor units (R1), (R3) and optionally (R2), and
b) supplying the at least one third oligomer composition (OC3) via pipes (3b), (3c) and (1c) to the third main reactor unit (R3),
c) polycondensation of the at least one first oligomer composition (OC1) in the main reactor units (R1) and optionally (R2), wherein the target product (T1) is obtained, and polycondensation of the at least one first oligomer composition (OC1) and the at least one third oligomer composition (OC3) in main reactor unit (R3), wherein the target product (T3) is obtained,
d) removing target product (T1) from the main reactor units (R1) and optionally
(R2) via pipes (6a) and optionally (6b), and removing target product (T3) from the main reactor unit (R3) via pipe (6c).

Therefore, the present invention also provides a method, wherein the third container (B3) is connected to the inlet of the third main reactor unit (R3) via a pipe (3b) and a pipe (3c), wherein the pipe (3b) is connected to pipe (1c), wherein a further operation mode (PT4) is performed:
(PT4) production of target products (T1) and (T3):
a) supplying the at least one first oligomer composition (OC1) via pipes (1), (1a), (1c) and optionally (1b) to the main reactor units (R1), (R3) and optionally (R2), and
b) supplying the at least one third oligomer composition (OC3) via pipes (3b), (3c) and (1c) to the third main reactor unit (R3),
c) polycondensation of the at least one first oligomer composition (OC1) in the main reactor units (R1) and optionally (R2), wherein the target product (T1) is obtained, and polycondensation of the at least one first oligomer composition (OC1) and the at least one third oligomer composition (OC3) in the main reactor unit (R3), wherein the target product (T3) is obtained,
d) removing target product (T1) from the main reactor units (R1) and optionally (R2) via pipes (6a) and optionally (6b), and removing target product (T3) from the main reactor unit (R3) via pipe (6c).

It is clear for a skilled person that by performing operation mode (PT4), valves (V2), (V3a) and (V4) are closed. Valve (V3b) is only open for supplying the at least one third oligomer composition (OC3) via pipes (3b), (3c) and (1c) to the third main reactor unit (R3).

The polycondensation of the at least one first oligomer composition (OC1) and the at least one third oligomer composition (OC3) in the main reactor unit (R3) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

PT5

In case a third container (B3) is connected to the inlet of the third main reactor unit (R3) via a pipe (3b) and a pipe (3c), wherein the pipe (3b) is connected to pipe (1c), a further operation mode (PT5) can be performed.

Preferably, operation mode (PT5) is the simultaneous production of target products (T2), (T3) and optionally (T1) and comprises the following steps a) to e):
a) supplying the at least one first oligomer composition (OC1) via pipes (1), (1a), (1c) and optionally (1b) to the main reactor units (R1), (R3) and optionally (R2), and
b) supplying the at least one second oligomer composition (OC2) via pipes (2) and (1a) to the first main reactor unit (R1),
c) supplying the at least one third oligomer composition (OC3) via pipes (3b), (3c) and (1c) to the third main reactor unit (R3),
d) polycondensation of the at least one first oligomer composition (OC1) and the at least one second oligomer composition (OC2) in the main reactor unit (R1), wherein the target product (T2) is obtained, polycondensation of the at least one first oligomer composition (OC1) and the at least one third oligomer composition (OC3) in main reactor unit (R3), wherein the target product (T3) is obtained, and optionally polycondensation of the at least one first oligomer composition (OC1) in the main reactor unit (R2), wherein the target product (T1) is obtained, and
e) removing target product (T2) from the main reactor unit (R1) via pipe (6a), removing target product (T3) from the main reactor unit (R3) via pipe (6c), and optionally removing target product (T1) from the main reactor unit (R2) via pipe (6b).

PT6

In case the plant further comprises a fourth container (B4), wherein the fourth container (B4) is connected to the inlet of the first main reactor unit (R1) via a pipe (4), wherein the pipe (4) is connected to pipe (1a), and wherein the method further comprises the step of providing at least one fourth oligomer composition (OC4) comprising at least one fourth oligomer (O4) obtained by melting of at least one polyesterol, a further operation mode (PT6) can be performed.

Preferably, operation mode (PT6) is the simultaneous production of target products (T1) and (T4), wherein (T4) is a copolyester on the basis of terephthalic acid, at least one 1,ω-diol and optionally at least one further component selected from the group consisting of polyhydroxy compounds, aliphatic 1,ω-dicarboxylic acids, 1,ω-glycols and aromatic 1,ω-dicarboxylic acids, and comprises the following steps a) to d):
a) supplying the at least one first oligomer composition (OC1) via pipes (1), (1a), (1c) and optionally (1b) to the main reactor units (R1), (R3) and optionally (R2),
b) supplying the at least one fourth oligomer composition (OC4) via pipes (4) and (1a) to the first main reactor unit (R1),
c) polycondensation of the at least one first oligomer composition (OC1) and the at least one fourth oligomer composition (OC4) in the main reactor unit (R1), wherein the target product (T4) is obtained, and polycondensation of the at least one first oligomer composition (OC1) in the main reactor units (R3) and optionally (R2), wherein the target product (T1) is obtained, d) removing target product (T4) from the main reactor unit (R1) via pipe (6a), and removing target product (T1) from the main reactor units (R3) and optionally (R2) via pipes (6c) and optionally (6b).

Therefore, the present invention also provides a method, wherein the plant further comprises a fourth container (B4), wherein the fourth container (B4) is connected to the inlet of the first main reactor unit (R1) via a pipe (4), wherein the pipe (4) is connected to pipe (1a), and wherein the method further comprises the step of providing at least one fourth oligomer composition (OC4) comprising at least one fourth oligomer (O4) obtained by melting of at least one polyesterol, and wherein a further operation mode (PT6) is performed:

(PT6) simultaneous production of target products (T1) and (T4), wherein (T4) is a copolyester on the basis of terephthalic acid, at least one 1,ω-diol and optionally at least one further component selected from the group consisting of polyhydroxy compounds, aliphatic 1,ω-dicarboxylic acids, 1,ω-glycols and aromatic 1,ω-dicarboxylic acids:

a) supplying the at least one first oligomer composition (OC1) via pipes (1), (1a), (1c) and optionally (1b) to the main reactor units (R1), (R3) and optionally (R2), b) supplying the at least one fourth oligomer composition (OC4) via pipes (4) and (1a) to the first main reactor unit (R1), c) polycondensation of the at least one first oligomer composition (OC1) and the at least one fourth oligomer composition (OC4) in the main reactor unit (R1), wherein the target product (T4) is obtained, and polycondensation of the at least one first oligomer composition (OC1) in the main reactor units (R3) and optionally (R2), wherein the target product (T1) is obtained, d) removing target product (T4) from the main reactor unit (R1) via pipe (6a), and removing target product (T1) from the main reactor units (R3) and optionally (R2) via pipes (6c) and optionally (6b).

It is clear for a skilled person that by performing operation mode (PT6), valves (V2), (V3a), (V3b) and (V3c) are closed.

The polycondensation of the at least one first oligomer composition (OC1) and the at least one fourth oligomer composition (OC4) in the main reactor unit (R1) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

PT7

In case a third container (B3) is connected to the inlet of the third main reactor unit (R3) via a pipe (3b) and a pipe (3c), wherein the pipe (3b) is connected to pipe (1c), and a fourth container (B4) is connected to the inlet of the first main reactor unit (R1) via a pipe (4), wherein the pipe (4) is connected to pipe (1a), and wherein the method further comprises the step of providing at least one fourth oligomer composition (OC4) comprising at least one fourth oligomer (O4) obtained by melting of at least one polyesterol, a further operation mode (PT7) can be performed.

Preferably, operation mode (PT7) is the simultaneous production of target products (T4), (T3) and optionally (T1) and comprises the following steps a) to e):

a) supplying the at least one first oligomer composition (OC1) via pipes (1), (1a), (1c) and optionally (1b) to the main reactor units (R1), (R3) and optionally (R2), b) supplying the at least one fourth oligomer composition (OC4) via pipes (4) and (1a) to the first main reactor unit (R1), c) supplying the at least one third oligomer composition (OC3) via pipes (3b), (3c) and (1c) to the third main reactor unit (R3), d) polycondensation of the at least one first oligomer composition (OC1) and the at least one fourth oligomer composition (OC4) in the main reactor unit (R1), wherein the target product (T4) is obtained, polycondensation of the at least one first oligomer composition (OC1) and the at least one third oligomer composition (OC3) in main reactor unit (R3), wherein the target product (T3) is obtained, and optionally polycondensation of the at least one first oligomer composition (OC1) in the main reactor unit (R2), wherein the target product (T1) is obtained, and, e) removing target product (T4) from the main reactor unit (R1) via pipe (6a), removing target product (T3) from the main reactor unit (R3) via pipe (6c), and optionally removing target product (T1) from the main reactor unit (R2) via pipe (6b).

It is clear for a skilled person that by performing operation mode (PT7), valves (V2) and (V3a) are closed.

PT8

In case the plant further comprises a fifth container (B5), wherein the fifth container (B5) is connected to the inlet of the third main reactor unit (R3) via a pipe (5), wherein the pipe (5) is connected to pipe (3b) and pipe (3b) is connected to pipe (1c), and wherein the method further comprises the step of providing at least one fifth oligomer composition (OC5) comprising at least one fifth oligomer (O5) obtained by the alkoxylation of at least one low molecular weight compound, having 2 to 6 hydroxyl functions, with at least one alkylene oxide, which is different from tetra methylene oxide, in the fifth container (B5), a further operation mode (PT8) can be performed.

Preferably, operation mode (PT8) is the simultaneous production of target products (T1) and (T5), wherein (T5) is a copolyester on the basis of terephthalic acid, at least one alkylene oxide, which is different from tetra methylene oxide, and at least one aliphatic 1,ω-diol, and comprises the following steps a) to d):

a) supplying the at least one first oligomer composition (OC1) via pipes (1), (1a), (1c) and optionally (1b) to the main reactor units (R1), (R3) and optionally (R2), and b) supplying the at least one fifth oligomer composition (OC5) via pipes (5), (3b) and (1c) to the third main reactor unit (R3), c) polycondensation of the at least one first oligomer composition (OC1) and the at least one fifth oligomer composition (OC5) in the main reactor unit (R3), wherein the target product (T5) is obtained, and polycondensation of the at least one first oligomer composition (OC1) in main reactor units (R1) and optionally (R2), wherein the target product (T1) is obtained, d) removing target product (T5) from the main reactor unit (R3) via pipe (6c) and removing target product (T1) from the main reactor units (R1) and optionally (R2) via pipes (6a) and optionally (6b).

Therefore, the present invention also provides a method, wherein the plant further comprises a fifth container (B5), wherein the fifth container (B5) is connected to the inlet of the third main reactor unit (R3) via a pipe (5), wherein the pipe (5) is connected to pipe (3b) and pipe (3b) is connected to pipe (1c), and wherein the method further comprises the step of providing at least one fifth oligomer composition (OC5) comprising at least one fifth oligomer (O5) obtained by the alkoxylation of at least one low molecular weight compound, having 2 to 6 hydroxyl functions, with at least one alkylene oxide, which is different from tetra methylene oxide, in the fifth container (B5), and wherein a further operation mode (PT8) is performed:

(PT8) simultaneous production of target products (T1) and (T5), wherein (T5) is a copolyester on the basis of terephthalic acid, at least one alkylene oxide, which is different from tetra methylene oxide, and at least one aliphatic 1,ω-diol:
- a) supplying the at least one first oligomer composition (OC1) via pipes (1), (1a), (1c) and optionally (1b) to the main reactor units (R1), (R3) and optionally (R2), and
- b) supplying the at least one fifth oligomer composition (OC5) via pipes (5), (3b) and (1c) to the third main reactor unit (R3),
- c) polycondensation of the at least one first oligomer composition (OC1) and the at least one fifth oligomer composition (OC5) in the main reactor unit (R3), wherein the target product (T5) is obtained, and polycondensation of the at least one first oligomer composition (OC1) in main reactor units (R1) and optionally (R2), wherein the target product (T1) is obtained,
- d) removing target product (T5) from the main reactor unit (R3) via pipe (6c) and removing target product (T1) from the main reactor units (R1) and optionally (R2) via pipes (6a) and optionally (6b).

It is clear for a skilled person that by performing operation mode (PT8) valves (V2), (V3a), (V3c) and (V4) are closed.

The polycondensation of the at least one first oligomer composition (OC1) and the at least one fifth oligomer composition (OC5) in the main reactor unit (R3) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

PT9

In case the plant further comprises a fifth container (B5), wherein the fifth container (B5) is connected to the inlet of the third main reactor unit (R3) via a pipe (5), wherein the pipe (5) is connected to pipe (3b) and pipe (3b) is connected to pipe (1c), and wherein the method further comprises the step of providing at least one fifth oligomer composition (OC5) comprising at least one fifth oligomer (O5) obtained by the alkoxylation of at least one low molecular weight compound, having 2 to 6 hydroxyl functions, with at least one alkylene oxide, which is different from tetra methylene oxide, in the fifth container (B5), a further operation mode (PT9) can be performed.

Preferably, operation mode (PT9) is the simultaneous production of target products (T5), (T2) and optionally (T1) and comprises the following steps a) to e):
- a) supplying the at least one first oligomer composition (OC1) via pipes (1), (1a), (1c) and optionally (1b) to the main reactor units (R1), (R3) and optionally (R2), and
- b) supplying the at least one fifth oligomer composition (OC5) via pipes (5), (3b) and (1c) to the third main reactor unit (R3),
- c) supplying the at least one second oligomer composition (OC2) via pipes (2) and (1a) to the first main reactor unit (R1),
- d) polycondensation of the at least one first oligomer composition (OC1) and the at least one fifth oligomer composition (OC5) in the main reactor unit (R3), wherein the target product (T5) is obtained, polycondensation of the at least one first oligomer composition (OC1) and the at least one second oligomer composition (OC2) in the main reactor unit (R1), wherein the target product (T2) is obtained, and optionally polycondensation of the at least one first oligomer composition (OC1) in the main reactor unit (R2), wherein the target product (T1) is obtained,
- e) removing target product (T5) from the main reactor unit (R3) via pipe (6c), removing target product (T2) from the main reactor unit (R1) via pipe (6a), and optionally removing target product (T1) from the main reactor unit (R2) via pipe (6b).

PT10

In case the plant further comprises a fifth container (B5), wherein the fifth container (B5) is connected to the inlet of the third main reactor unit (R3) via a pipe (5), wherein the pipe (5) is connected to pipe (3b) and pipe (3b) is connected to pipe (1c), and a fourth container (B4), wherein the fourth container (B4) is connected to the inlet of the first main reactor unit (R1) via a pipe (4), wherein the pipe (4) is connected to pipe (1a), a further operation mode (PT10) can be performed.

Preferably, operation mode (PT10) is the simultaneous production of target products (T5), (T4) and optionally (T1) and comprises the following steps a) to e):
- a) supplying the at least one first oligomer composition (OC1) via pipes (1), (1a), (1c) and optionally (1b) to the main reactor units (R1), (R3) and optionally (R2), and
- b) supplying the at least one fifth oligomer composition (OC5) via pipes (5), (3b) and (1c) to the third main reactor unit (R3),
- c) supplying the at least one fourth oligomer composition (OC4) via pipes (4) and (1a) to the first main reactor unit (R1),
- d) polycondensation of the at least one first oligomer composition (OC1) and the at least one fifth oligomer composition (OC5) in the main reactor unit (R3), wherein the target product (T5) is obtained, polycondensation of the at least one first oligomer composition (OC1) and the at least one fourth oligomer composition (OC4) in the main reactor unit (R1), wherein the target product (T4) is obtained, and optionally polycondensation of the at least one first oligomer composition (OC1) in main reactor unit (R2), wherein the target product (T1) is obtained,
- e) removing target product (T5) from the main reactor unit (R3) via pipe (6c), removing target product (T4) from the main reactor unit (R1) via pipe (6a), and optionally removing target product (T1) from the main reactor unit (R2) via pipe (6b).

Target Product (T1)

Target product (T1) is a terephthalate polyester.

The terms "target product (T1)" and "terephthalate polyester" for the purpose of the present invention are synonymous and are used interchangeably throughout the present invention.

The terephthalate polyester is obtained by the polycondensation of the at least one first oligomer composition (OC1). The at least one first oligomer composition (OC1) comprises at least one first oligomer (O1) obtained by the condensation reaction of terephthalic acid and at least one 1,ω-diol.

In a preferred embodiment, target product (T1) is the polycondensation product of
- i) 100 mol %, based on component i), of terephthalic acid, and
- ii) 100 to 104 mol %, based on component i), of at least one aliphatic 1,ω-diol.

Therefore, the present invention also provides a method, wherein target product (T1) is the polycondensation product of
i) 100 mol %, based on component i), of terephthalic acid, and
ii) 100 to 104 mol %, based on component i), of at least one aliphatic 1,ω-diol.

In a preferred embodiment, the terephthalate polyester is polyethylene terephthalate (PET), polytrimethylene terephthalate (PTT) or polybutylene terephthalate (PBT).

In a further particularly preferred embodiment, the terephthalate polyester is polybutylene terephthalate (PBT).

The terephthalate polyester generally has an acid number of <50 meq/kg, preferably <35 meq/kg, and more preferably <30 meq/kg. The acid number is determined by titration with sodium hydroxide or by FTIR measurement.

Furthermore, the weight average molecular weight ($M_w$) of the terephthalate polyester is customarily in the range from 2 000 to 80 000 g/mol, preferably in the range from 5 000 to 80 000 g/mol, and more preferably in the range from 20 000 to 80 000 g/mol. The weight average molecular weight ($M_w$) is determined according to ASTM D5001.

The terephthalate polyester generally has a viscosity number in the range from 60 to 180 ml/g, preferably in the range from 90 to 170 ml/g, and more preferably in the range from 100 to 165 ml/g. The viscosity number is determined in a solution of 0.5% by weight of the terephthalate polyester in a mixture of phenol/trichlorobenzene in accordance with ISO 307.

Target Product (T2)

The target product (T2) is a copolyester on the basis of terephthalic acid, at least one aliphatic 1,ω-dicarboxylic acid and at least one aliphatic 1,ω-diol.

The terms "target product (T2)" and "copolyester on the basis of terephthalic acid, at least one aliphatic 1,ω-dicarboxylic acid and at least one aliphatic 1,ω-diol" for the purpose of the present invention are synonymous and are used interchangeably throughout the present invention.

The target product (T2) is obtained by the polycondensation of the at least one first oligomer composition (OC1) and the at least one second oligomer composition (OC2). The at least one second oligomer composition (OC2) comprises at least one second oligomer (O2) obtained by the condensation reaction of at least one aliphatic 1,ω-dicarboxylic acid and at least one aliphatic 1,ω-diol.

In a preferred embodiment, target product (T2) is the polycondensation product of
i) 30 to 60 mol %, based on components i) to ii), of terephthalic acid,
ii) 40 to 70 mol %, based on components i) to ii), of at least one aliphatic 1,ω dicarboxylic acid, and
iii) 100 to 104 mol %, based on components i) to ii), of at least one aliphatic 1,ω-diol.

Therefore, the present invention also provides a method, wherein target product (T2) is the polycondensation product of
i) 30 to 60 mol %, based on components i) to ii), of terephthalic acid,
ii) 40 to 70 mol %, based on components i) to ii), of at least one aliphatic 1,ω dicarboxylic acid, and
iii) 100 to 104 mol %, based on components i) to ii), of at least one aliphatic 1,ω-diol.

Target product (T2) generally has an acid number of <50 meq/kg, preferably <35 meq/kg, and more preferably <25 meq/kg. The acid number is determined by titration with sodium hydroxide or by FTIR measurement.

Target Product (T3)

Target product (T3) is a copolyester on the basis of terephthalic acid, polytetramethylene glycol and at least one aliphatic 1,ω-diol.

The terms "target product (T3)" and "copolyester on the basis of terephthalic acid, polytetramethylene glycol and at least one aliphatic 1,ω-diol" for the purpose of the present invention are synonymous and are used interchangeably throughout the present invention.

The target product (T3) is obtained by the polycondensation of the product (P1). The product (P1) is obtained by mixing the at least one third oligomer composition (OC3) and the at least one first oligomer composition (OC1) and comprises the at least one third oligomer composition (OC3) and the at least one first oligomer composition (OC1) in reacted form.

"In reacted form" for the purpose of the present invention means that the product (P1) is the condensation product of the at least one first oligomer composition (OC1) and the at least one third oligomer composition (OC3).

The at least one first oligomer composition (OC1) comprises at least one first oligomer (O1) obtained by the condensation reaction of terephthalic acid and at least one 1,ω-diol, and the at least one third oligomer composition (OC3) comprises at least one third oligomer (O3) obtained by the polymerization of tetra methylene oxide.

In a preferred embodiment, target product (T3) is the polycondensation product of
i) 100 mol %, based on component i), of terephthalic acid,
ii) 30 to 74 mol %, based on component i), of at least one tetra methylene oxide, and
iii) 30 to 74 mol %, based on component i), of at least one aliphatic 1,ω-diol,
wherein the sum of components ii) and iii) is in the range from 100 to 104 mol %.

Therefore, the present invention also provides a method, wherein target product (T3) is the polycondensation product of
i) 100 mol %, based on component i), of terephthalic acid,
ii) 30 to 74 mol %, based on component i), of at least one tetra methylene oxide, and
iii) 30 to 74 mol %, based on component i), of at least one aliphatic 1,ω-diol,
wherein the sum of components ii) and iii) is in the range from 100 to 104 mol %.

The melting temperature ($T_M$) of target product (T3) is customarily in the range from 60 to 220° C., preferably in the range from 100 to 200° C., and more preferably in the range from 120 to 170° C., determined by differential scanning calorimetry (DSC) or by dynamic mechanical thermoanalysis (DMTA).

The weight average molecular weight ($M_w$) of the target product (T3) is customarily in the range from 2000 to 150 000 g/mol, preferably in the range from 10 000 to 120 000 g/mol, and more preferably in the range from 20 000 to 80 000 g/mol. The weight average molecular weight (MW) is determined according to ASTM D5001.

Target Product (T4)

Target product (T4) is a copolyester on the basis of terephthalic acid, at least one 1,ω-diol and optionally at least one further component selected from the group consisting of polyhydroxy compounds, aliphatic 1,ω-dicarboxylic acids, 1,ω-glycols and aromatic 1,ω-dicarboxylic acids.

The terms "target product (T4)" and "copolyester on the basis of terephthalic acid, at least one 1,ω-diol and optionally at least one further component selected from the group consisting of polyhydroxy compounds, aliphatic 1,ω-dicarboxylic acids, 1,ω-glycols and aromatic 1,ω-dicarboxylic acids" for the purpose of the present invention are synonymous and are used interchangeably throughout the present invention.

Optionally, the target product (T4) is obtained by the polycondensation of the at least one first oligomer composition (OC1) and the at least one fourth oligomer composition (OC4).

The at least one first oligomer composition (OC1) comprises at least one first oligomer (O1) obtained by the condensation reaction of terephthalic acid and at least one 1,ω-diol, and the at least one fourth oligomer composition (OC4) optionally comprises at least one fourth oligomer (O4) obtained by melting of at least one polyesterol.

In a preferred embodiment, target product (T4) is the polycondensation product of
i) 10 to 100 mol %, based on components i) to ii), of terephthalic acid,
ii) 0 to 90 mol %, based on components i) to ii), of at least one aliphatic and/or at least one aromatic 1,ω-dicarboxylic acid, wherein the at least one aromatic 1,ω-dicarboxylic acid is different from the terephthalic acid,
iii) 30 to 102 mol %, based on components i) to ii), of at least one 1,ω-diol, and
iv) 0 to 72 mol %, based on components i) to ii), of at least one 1,ω-glycol and/or at least one polyhydroxy compound, wherein the at least one 1,ω-glycol is different from the at least one 1,ω-diol,
wherein the sum of components iii) and iv) is in the range from 100 to 102 mol %.

Therefore, another object of the present invention is to provide a method, wherein target product (T4) is the polycondensation product of
i) 10 to 100 mol %, based on components i) to ii), of terephthalic acid,
ii) 0 to 90 mol %, based on components i) to ii), of at least one aliphatic and/or at least one aromatic 1,ω-dicarboxylic acid, wherein the at least one aromatic 1,ω-dicarboxylic acid is different from the terephthalic acid,
iii) 30 to 102 mol %, based on components i) to ii), of at least one 1,ω-diol, and
iv) 0 to 72 mol %, based on components i) to ii), of at least one 1,ω-glycol and/or at least one polyhydroxy compound, wherein the at least one 1,ω-glycol is different from the at least one 1,ω-diol,
wherein the sum of components iii) and iv) is in the range from 100 to 102 mol %.

The weight average molecular weight ($M_w$) of the target product (T4) is customarily in the range from 2 000 to 100 000 g/mol, preferably in the range from 5 000 to 90 000 g/mol, and more preferably in the range from 20 000 to 80 000 g/mol. The weight average molecular weight (MW) is determined according to ASTM D5001.

The target product (T4) generally has a viscosity number in the range from 40 to 120 ml/g, preferably in the range from 50 to 110 ml/g, and more preferably in the range from 60 to 100 ml/g. The viscosity number is determined in a solution of 0.5% by weight of the target product (T4) in a mixture of phenol/trichlorobenzene at 25° C. in accordance with ISO 307.

Target Product (T5)

Target product (T5) is a copolyester on the basis of terephthalic acid, at least one polyalkylene glycol, which is different from polytetramethylene glycole, and at least one aliphatic 1,ω-diol.

The terms "target product (T5)" and "copolyester on the basis of terephthalic acid, at least one polyalkylene oxide, which is different from polytetramethylene glycole, and at least one aliphatic 1,ω-diol" for the purpose of the present invention are synonymous and are used interchangeably throughout the present invention.

Optionally, target product (T5) is obtained by polycondensation of the at least one first oligomer composition (OC1) and the at least one fifth oligomer composition (OC5).

The at least one first oligomer composition (OC1) comprises at least one first oligomer (O1) obtained by the condensation reaction of terephthalic acid and at least one 1,ω-diol, and the at least one fifth oligomer composition (OC5) optionally comprises at least one fifth oligomer (O5) obtained by the polymerization of at least one alkylene oxide, which is different from tetra methylene oxide.

In a preferred embodiment, target product (T5) is the polycondensation product of
i) 100 mol %, based on component i), of terephthalic acid,
ii) 30 to 72 mol %, based on component i), of at least one polyalkylene glycol, which is different from polytetramethylene glycol, and
iii) 30 to 72 mol %, based on component i), of at least one aliphatic 1,ω-diol,
wherein the sum of components ii) and iii) is in the range from 100 to 102 mol %.

Therefore, the present invention also provides a method, wherein target product (T5) is the polycondensation product of
i) 100 mol %, based on component i), of terephthalic acid,
ii) 30 to 72 mol %, based on component i), of at least one polyalkylene glycol, which is different from polytetramethylene glycol, and
iii) 30 to 72 mol %, based on component i), of at least one aliphatic 1,ω-diol,
wherein the sum of components ii) and iii) is in the range from 100 to 102 mol %.

The weight average molecular weight ($M_w$) of the target product (T5) is customarily in the range from 2 000 to 150 000 g/mol, preferably in the range from 10 000 to 120 000 g/mol, and more preferably in the range from 20 000 to 60 000 g/mol. The weight average molecular weight ($M_w$) is determined according to ASTM D5001.

The target product (T5) generally has a viscosity number in the range from 10 to 100 ml/g, preferably in the range from 20 to 90 ml/g, and more preferably in the range from 30 to 80 ml/g. The viscosity number is determined in a solution of 0.5% by weight of the target product (T5) in HFIP at 25° C. in accordance with ISO 307.

The invention claimed is:

1. A method for the combined production of at least two target products selected from the group consisting of (T1), (T2) and (T3), wherein
   (T1) is a terephthalate polyester,
   (T2) is a copolyester on the basis of terephthalic acid, at least one aliphatic 1,ω-dicarboxylic acid, and at least one aliphatic 1,ω-diol, and
   (T3) is a copolyester on the basis of terephthalic acid, polytetramethylene glycol, and at least one aliphatic 1,ω-diol,
in a plant comprising
   a first container (B1), a second container (B2), a third container (B3), and a main reactor (HR), wherein
   the main reactor (HR) comprises a first main reactor unit (R1), a third main reactor unit (R3), and optionally a second main reactor unit (R2) and, wherein
   a pipe (1) connects the first container (B1) to the main reactor units (R1), (R3), and optionally (R2), wherein pipe (1) is divided into pipes (1a), (1c), and optionally (1b), wherein pipe (1a) is connected to an inlet of the first main reactor unit (R1), pipe (1c) is connected to an inlet of the third main reactor unit (R3), and optionally, pipe (1b) is connected to an inlet of the second main reactor unit (R2), wherein a pipe (6a) is connected to an outlet of the first main reactor unit (R1), a pipe (6c) is connected to an outlet of the third main reactor unit (R3), and optionally, a pipe (6b) is connected to an outlet of the second main reactor unit (R2), wherein the second container (B2) can be connected to the inlet of the first main reactor unit (R1) via a pipe (2), wherein the pipe (2) is connected to pipe (1a), and the third container (B3) can be connected to the first container (B1) via a pipe (3a) and a pipe (3c), the method comprising a) providing at least one first oligomer composition (OC1) comprising at least one first oligomer (O1) obtained by a condensation reaction of terephthalic acid and at least one aliphatic 1,ω-diol in the first container (B1), b) providing at least one second oligomer composition (CO2) comprising at least one second oligomer (O2) obtained by a condensation reaction of at least one aliphatic 1,ω-dicarboxylic acid and at least one aliphatic 1,ω-diol in the second container (B2), c) providing at least one third oligomer composition (OC3) comprising at least one third oligomer (O3) obtained by a polymerization of tetra methylene oxide in the third container (B3), d) performing alternatingly at least two of the following operation modes selected from the group consisting of (PT1), (PT2), and (PT3):

(PT1) production of target product (T1):
 a) supplying the at least one first oligomer composition (OC1) via pipes (1), (1a), (1c), and optionally (1b) to the main reactor units (R1), (R3), and optionally (R2),
 b) polycondensation of the at least one first oligomer composition (OC1) in the main reactor units (R1), (R3), and optionally (R2), wherein the target product (T1) is obtained,
 c) removing the target product (T1) from the main reactor units (R1), (R3), and optionally (R2) via pipes (6a), (6c), and optionally (6b), (PT2) simultaneous production of target products (T1) and (T2):
 a) supplying the at least one first oligomer composition (OC1) via pipes (1), (1a), (1c), and optionally (1b) to the main reactor units (R1), (R3), and optionally (R2), and
 b) supplying the at least one second oligomer composition (OC2) via pipes (2) and (1a) to the first main reactor unit (R1),
 c) polycondensation of the at least one first oligomer composition (OC1) and the at least one second oligomer composition (OC2) in the main reactor unit (R1), wherein the target product (T2) is obtained, and polycondensation of the at least one first oligomer composition (OC1) in main reactor units (R3) and optionally (R2), wherein the target product (T1) is obtained,
 d) removing target product (T2) from the main reactor unit (R1) via pipe (6a), and removing target product (T1) from the main reactor units (R3) and optionally (R2) via pipes (6c) and optionally (6b), (PT3) production of target product (T3):
 a) supplying the at least one third oligomer composition (OC3) via pipes (3a) and (3c) to the first container (B1),
 b) mixing the at least one third oligomer composition (OC3) and the at least one first oligomer composition (OC1) in the first container (B1), wherein a product (P1) is obtained comprising the at least one third oligomer composition (OC3) and the at least one first oligomer composition (OC1) in reacted form,
 c) supplying the product (P1) via pipes (1), (1a), (1c), and optionally (1b) to the main reactor units (R1), (R3), and optionally (R2),
 d) polycondensation of the product (P1) in the main reactor units (R1), (R3), and optionally (R2), wherein the target product (T3) is obtained,
 e) removing the target product (T3) from the main reactor units (R1), (R3), and optionally (R2) via pipes (6a), (6c), and optionally (6b).

2. The method according to claim 1, wherein the third container (B3) is connected to the inlet of the third main reactor unit (R3) via a pipe (3b) and a pipe (3c), wherein the pipe (3b) is connected to pipe (1c), wherein a further operation mode (PT4) is performed:

(PT4) production of target products (T1) and (T3):
 a) supplying the at least one first oligomer composition (OC1) via pipes (1), (1a), (1c), and optionally (1b) to the main reactor units (R1), (R3), and optionally (R2), and
 b) supplying the at least one third oligomer composition (OC3) via pipes (3b), (3c), and (1c) to the third main reactor unit (R3),
 c) polycondensation of the at least one first oligomer composition (OC1) in the main reactor units (R1) and optionally (R2), wherein the target product (T1) is obtained, and polycondensation of the at least one first oligomer composition (OC1) and the at least one third oligomer composition (OC3) in the main reactor unit (R3), wherein the target product (T3) is obtained,
 d) removing target product (T1) from the main reactor units (R1) and optionally (R2) via pipes (6a) and optionally (6b), and removing target product (T3) from the main reactor unit (R3) via pipe (6c).

3. The method according to claim 1, wherein the plant further comprises a fourth container (B4), wherein the fourth container (B4) is connected to the inlet of the first main reactor unit (R1) via a pipe (4), wherein the pipe (4) is connected to pipe (1a), and wherein the method further comprises the step of providing at least one fourth oligomer composition (OC4) comprising at least one fourth oligomer (O4) obtained by melting of at least one polyesterol, and wherein a further operation mode (PT6) is performed:

(PT6) simultaneous production of target products (T1) and (T4), wherein (T4) is a copolyester on the basis of terephthalic acid, at least one 1,ω-diol, and optionally at least one further component selected from the group consisting of polyhydroxy compounds, aliphatic 1,ω-dicarboxylic acids, 1,ω-glycols, and aromatic 1,ω-dicarboxylic acids:

a) supplying the at least one first oligomer composition (OC1) via pipes (1), (1a), (1c), and optionally (1b) to the main reactor units (R1), (R3), and optionally (R2), b) supplying the at least one fourth oligomer composition (OC4) via pipes (4) and (1a) to the first main reactor unit (R1), c) polycondensation of the at least one first oligomer composition (OC1) and the at least one fourth oligomer composition (OC4) in the main reactor unit (R1), wherein the target product (T4) is obtained, and polycondensation of the at least one first oligomer composition (OC1) in the main reactor units (R3), and optionally (R2), wherein the target product (T1) is obtained, d) removing target product (T4) from the main reactor unit (R1) via pipe (6a), and removing target product (T1) from the main reactor units (R3) and optionally (R2) via pipes (6c) and optionally (6b).

4. The method according to claim 1, wherein the plant further comprises a fifth container (B5), wherein the fifth container (B5) is connected to the inlet of the third main reactor unit (R3) via a pipe (5), wherein the pipe (5) is connected to pipe (3b) and pipe (3b) is connected to pipe (1c), and wherein the method further comprises providing at least one fifth oligomer composition (OC5) comprising at least one fifth oligomer (O5) obtained by the alkoxylation of at least one low molecular weight compound, having 2 to 6 hydroxyl functions, with at least one alkylene oxide, which is different from tetra methylene oxide, in the fifth container (B5), and wherein a further operation mode (PT8) is performed:

(PT8) simultaneous production of target products (T1) and (T5), wherein (T5) is a copolyester on the basis of terephthalic acid, at least one polyalkylene glycol, which is different from polytetramethylene glycol, and at least one aliphatic 1,ω-diol:

a) supplying the at least one first oligomer composition (OC1) via pipes (1), (1a), (1c), and optionally (1b) to the main reactor units (R1), (R3), and optionally (R2), and b) supplying the at least one fifth oligomer composition (OC5) via pipes (5), (3b), and (1c) to the third main reactor unit (R3), c) polycondensation of the at least one first oligomer composition (OC1) and the at least one fifth oligomer composition (OC5) in the main reactor unit (R3), wherein the target product (T5) is obtained, and polycondensation of the at least one first oligomer composition (OC1) in main reactor units (R1) and optionally (R2), wherein the target product (T1) is obtained, d) removing target product (T5) from the main reactor unit (R3) via pipe (6c) and removing target product (T1) from the main reactor units (R1) and optionally (R2) via pipes (6a) and optionally (6b).

5. The method according to claim 1, wherein the at least one aliphatic 1,ω-dicarboxylic acid is selected from the group consisting of succinic acid, adipic acid, and sebacic acid.

6. The method according to claim 1, wherein the at least one aliphatic 1,ω-diol is selected from the group consisting of 1,2-ethanediol, 1,3-propanediol, 1,4-butanediol, and diethylene glycol.

7. The method according to claim 4, wherein the at least one alkylene oxide, which is different from tetra methylene oxide, is selected from ethylene oxide, propylene oxide, butylene oxide, styrene oxide, and mixtures thereof.

8. The method according to claim 1, wherein the at least one first oligomer composition (OC1) has an OH number in the range from 30 to 80 mg KOH/g.

9. The method according to claim 1, wherein the at least one second oligomer composition (OC2) has an OH number in the range from 30 to 80 mg KOH/g.

10. The method according to claim 1, wherein the at least one third oligomer (O3) has a weight-average molecular weight ($M_w$) in the range from 600 to 2400 g/mol.

11. The method according to claim 3, wherein the at least one polyesterol is the polycondensation product of
i) at least one aromatic and/or aliphatic 1,ω-dicarboxylic acid, and
ii) at least one 1,ω-glycol and/or at least one polyhydroxy compound.

12. The method according to claim 1, wherein the main reactor (HR) is selected from reactors having a horizontal flow direction or from reactors having a vertical flow direction.

13. The method according to claim 1, wherein target product (T2) is the polycondensation product of
i) 30 to 60 mol %, based on components i) to ii), of terephthalic acid,
ii) 40 to 70 mol %, based on components i) to ii), of at least one aliphatic 1,ω-dicarboxylic acid, and
iii) 100 to 104 mol %, based on components i) to ii), of at least one aliphatic 1,ω-diol.

14. The method according to claim 1, wherein target product (T3) is the polycondensation product of
i) 100 mol %, based on component i), of terephthalic acid,
ii) 30 to 74 mol %, based on component i), of at least one tetra methylene oxide, and
iii) 30 to 74 mol %, based on component i), of at least one aliphatic 1,ω-diol,
wherein the sum of components ii) and iii) is in the range from 100 to 104 mol %.

15. The method according to claim 3, wherein target product (T4) is the polycondensation product of
i) 10 to 100 mol %, based on components i) to ii), of terephthalic acid,
ii) 0 to 90 mol %, based on components i) to ii), of at least one aliphatic and/or at least one aromatic 1,ω-dicarboxylic acid, wherein the at least one aromatic 1,ω-dicarboxylic acid is different from the terephthalic acid,
iii) 30 to 102 mol %, based on components i) to ii), of at least one 1,ω-diol, and
iv) 0 to 72 mol %, based on components i) to ii), of at least one 1,ω-glycol and/or at least one polyhydroxy compound, wherein the at least one 1,ω-glycol is different from the at least one 1,ω-diol,
wherein the sum of components iii) and iv) is in the range from 100 to 102 mol %.

16. The method according to claim 1, wherein target product (T1) is the polycondensation product of
i) 100 mol %, based on component i), of terephthalic acid, and
ii) 100 to 104 mol %, based on component i), of at least one aliphatic 1,ω-diol.

17. The method according to claim 4, wherein target product (T5) is the polycondensation product of
i) 100 mol %, based on component i), of terephthalic acid,
ii) 30 to 72 mol %, based on component i), of at least one polyalkylene glycol, which is different from polytetramethylene glycol, and iii) 30 to 72 mol %, based on component i), of at least one aliphatic 1,ω-diol, wherein the sum of components ii) and iii) is in the range from 100 to 102 mol %.

\* \* \* \* \*